United States Patent
Taniguchi

(10) Patent No.: US 9,453,467 B2
(45) Date of Patent: Sep. 27, 2016

(54) BI-FUEL ENGINE

(71) Applicant: HONDA MOTOR CO., LTD., Tokyo (JP)

(72) Inventor: Toru Taniguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 62 days.

(21) Appl. No.: 14/663,187

(22) Filed: Mar. 19, 2015

(65) Prior Publication Data
US 2015/0308356 A1 Oct. 29, 2015

(30) Foreign Application Priority Data

Apr. 23, 2014 (JP) .................. 2014-088919

(51) Int. Cl.
| | |
|---|---|
| *F02M 21/02* | (2006.01) |
| *F02M 21/04* | (2006.01) |
| *F02D 19/06* | (2006.01) |
| *F02D 19/08* | (2006.01) |
| *F01M 13/00* | (2006.01) |
| *F02D 11/02* | (2006.01) |
| *F02M 37/04* | (2006.01) |

(52) U.S. Cl.
CPC .......... *F02D 19/0642* (2013.01); *F01M 13/00* (2013.01); *F02D 11/02* (2013.01); *F02D 19/0613* (2013.01); *F02D 19/0647* (2013.01); *F02D 19/0673* (2013.01); *F02D 19/0676* (2013.01); *F02D 19/0681* (2013.01); *F02M 21/023* (2013.01); *F02M 21/0233* (2013.01); *F02M 21/0236* (2013.01); *F02M 37/04* (2013.01); *Y02T 10/36* (2013.01)

(58) Field of Classification Search
CPC ... Y02T 10/36; Y02T 10/32; F02D 41/0025; F02D 41/0027; F02D 19/0647

USPC ............... 123/515, 525, 527, 575, 576, 577
See application file for complete search history.

(56) References Cited

U.S. PATENT DOCUMENTS

| | | | | | |
|---|---|---|---|---|---|
| 2,377,607 | A | * | 6/1945 | Bodine, Jr. .............. | F02M 7/11 123/198 A |
| 2,896,599 | A | * | 7/1959 | Ensign ................... | F02M 21/00 123/179.16 |
| 3,650,255 | A | * | 3/1972 | McJones ................ | F02M 13/08 123/1 R |
| 3,960,126 | A | * | 6/1976 | Shinoda ............. | F02M 21/0239 123/527 |

(Continued)

FOREIGN PATENT DOCUMENTS

JP            60-21547 U      2/1985

*Primary Examiner* — Hung Q Nguyen
*Assistant Examiner* — Raza Najmuddin
(74) *Attorney, Agent, or Firm* — Westerman, Hattori, Daniels & Adrian, LLP

(57) ABSTRACT

Provided is a bi-fuel engine including a pressure supply passage extending from a crankcase chamber, and branching into a first branch passage and a second branch passage at a branching portion, a gas fuel valve provided in the gas fuel supply passage and connected to the first branch passage so that the gas fuel supply passage may be opened when pressure is supplied to the gas fuel supply passage, and may be closed when pressure is not supplied to the gas fuel supply passage, a liquid fuel pump provided in the liquid fuel supply passage and configured to feed the liquid fuel under pressure to the intake system by a pulsating pressure supplied via the second branch passage, and a switch valve provided in the branching portion to switch between the first and second branch passages for conducting pressure supplied from the pressure source via the pressure supply passage.

6 Claims, 3 Drawing Sheets

(56) References Cited

U.S. PATENT DOCUMENTS

| | | | | |
|---|---|---|---|---|
| 4,453,523 A * | 6/1984 | Poehlman | F02M 27/02 123/525 |
| 4,483,302 A * | 11/1984 | Mannessen | F02M 21/06 123/527 |
| 4,520,785 A * | 6/1985 | Batchelor | F02M 21/04 123/27 GE |
| 4,526,155 A * | 7/1985 | van den Wildenberg | G05D 16/163 123/525 |
| 4,535,728 A * | 8/1985 | Batchelor | F02B 43/00 123/27 GE |
| 4,597,364 A * | 7/1986 | Young | F02B 43/00 123/27 GE |
| 4,614,168 A * | 9/1986 | Batchelor | F02B 43/00 123/27 GE |
| 6,901,889 B1 * | 6/2005 | Ritter | F02D 19/0607 123/27 GE |
| 7,387,091 B2 * | 6/2008 | Ritter | F02B 29/0418 123/27 GE |
| 8,851,053 B2 * | 10/2014 | Shudo | F02D 19/02 123/527 |
| 8,935,078 B1 * | 1/2015 | Lorts | F02M 69/54 123/457 |
| 2004/0173192 A1 * | 9/2004 | Sorter | F02B 43/08 123/528 |
| 2006/0054144 A1 * | 3/2006 | Tokunaga | F02M 21/0239 123/527 |
| 2009/0277419 A1 * | 11/2009 | Kojima | F02M 13/08 123/445 |

* cited by examiner

BI-FUEL ENGINE

TECHNICAL FIELD

The present invention relates to a bi-fuel engine that can use both liquid fuel and gas fuel in a selective manner.

BACKGROUND OF THE INVENTION

An engine is known that is provided with a liquid fuel tank for supplying liquid fuel such as gasoline and a gas fuel tank for supplying gas fuel such as LPG, and can use either one of the fuels in a selective manner. See JP60-21547U, for instance. This engine is also capable of changing the ratio of the two fuels depending on the prices and availability of the fuels.

In such an engine, to simplify the setting of the combustion condition, the engine may be configured such that only one of the fuels can be used at any given time. In such a case, it is necessary to shut off the fuel that is not selected from being supplied to the combustion chamber.

The supply of the undesired fuel can be shut off by providing a manually operated valve in each of the gas fuel supply passage connecting the gas fuel tank with the intake system of the engine and the liquid fuel supply passage connecting the liquid fuel tank with the intake system of the engine. The user opens the valve for the desired fuel while closing the valve for the undesired fuel. However, the user is required to operate the two valves, and this is not only inconvenient for the user but also creates the possibility that the user may fail to operate the valves as intended or required. Also, the valves are required to be free from leakage, and this adds to the cost of the engine.

BRIEF SUMMARY OF THE INVENTION

In view of such problems of the prior art, a primary object of the present invention is to provide a bi-fuel engine which is simple in structure, and easy for the user to operate.

To achieve such an object, the present invention provides a bi-fuel engine (1) that can selectively use one of gas fuel and liquid fuel, comprising: a gas fuel supply passage (26) connecting a gas fuel source (27) with an intake system (17); a liquid fuel supply passage (3) connecting a liquid fuel source (31) with the intake system (17); a pressure supply passage (35) extending from a pressure source (4) of the engine, and branching into a first branch passage (35B) and a second branch passage (35C) at a branching portion; a gas fuel on/off valve (28) provided in the gas fuel supply passage and connected to the first branch passage so that the gas fuel supply passage may be opened when pressure is supplied to the gas fuel supply passage, and may be closed when pressure is not supplied to the gas fuel supply passage; a liquid fuel pump (33) provided in the liquid fuel supply passage and configured to feed the liquid fuel under pressure to the intake system by a pulsating pressure supplied via the second branch passage; and a switch valve provided in the branching portion to switch between the first branch passage and the second branch passage for conducting pressure supplied from the pressure source via the pressure supply passage. The pressure source may consist of a crankcase chamber where pressure owing to the reciprocating movement of the piston and/or the blowby gas from the combustion chamber may be produced, or the interior of the intake system such as the intake passage where pressure owing to the suction created by the reciprocating movement of the piston may be produced.

According to this arrangement, one of the gas fuel and the liquid fuel can be selectively supplied simply by operating the switch valve. Because the switch valve is provided in the pressure supply passage that communicates the pressure source with the gas fuel on/off valve and the liquid fuel pump, instead of the gas fuel passage or the liquid fuel passage, there is no risk of leakage of the gas fuel or the liquid fuel from the switch valve. Therefore, the switch valve may consist of a relatively simple, economical valve. Because the supply of the liquid fuel can be stopped simply by ceasing the actuation of the liquid fuel pump, no on/off valve is required in the liquid fuel supply passage.

Typically, the pressure source of the engine comprises a crankcase chamber of the engine.

Thereby, the gas fuel on/off valve and the liquid fuel pump can be actuated by using the pressure in the crankcase chamber.

In such case, it may be arranged such that the crankcase chamber communicates with an intake passage via a blowby gas passage (38) so that pressure in the crankcase chamber is negative on average, and the gas fuel on/off valve is configured to open and close the gas fuel supply passage when supplied of negative pressure via the pressure supply passage.

Because the pressure in the pressure supply passage is negative on average, the risk of blowby gas leaking from the switch valve can be minimized.

Preferably, the gas fuel on/off valve is provided with a pressure adjustment mechanism (64).

In this case, because the gas fuel on/off valve additionally serves as the pressure adjustment valve which is normally required for an engine using gas fuel, the need for an additional on/off valve can be eliminated, and the number of component parts can be reduced.

According to a particularly preferred embodiment of the present invention, the gas fuel on/off valve comprises a case (41) internally defining a first chamber (49) and a second chamber (50) separated by a diaphragm (45); a fuel inlet (52) and a fuel outlet (53) formed in the case for connecting the first chamber in series with the gas fuel supply passage; a valve seat (96) provided between the fuel inlet and the fuel outlet in the first chamber; a valve member (58) configured to cooperate with the valve seat; and a pressure inlet port (74) communicating the second chamber with the first branch passage; wherein the diaphragm is positioned at a closed position for forcing the valve member to seat on the valve seat when no negative pressure is supplied to the second chamber, and at an open position for permitting the valve member to be displaced from the valve seat when negative pressure is supplied to the second chamber.

Thereby, the gas fuel on/off valve may have a highly simple structure using a diaphragm for selectively supplying and shutting off the gas fuel depending on the supply of pressure to the second chamber.

Preferably, the switch valve consists of a manually operated three-way valve.

Thereby, the switch valve may have a highly simple structure.

Thus, according to the bi-fuel engine defined above, the fuel can be selected by using a highly simple structure.

BRIEF DESCRIPTION OF THE DRAWINGS

Now the present invention is described in the following with reference to the appended drawings, in which.

DETAILED DESCRIPTION OF THE INVENTION

The bi-fuel engine embodying the present invention can use either one of gas fuel and liquid fuel at any given time. The gas fuel may consist of any fuel that is in gas form under normal temperature and pressure condition such as LPG and hydrogen, and the liquid fuel may consist of any fuel that is in liquid form under normal temperature and pressure condition such as gasoline and diesel fuel. In the illustrated embodiment, the gas fuel consists of LPG, and the liquid fuel consists of gasoline.

Figure 1:
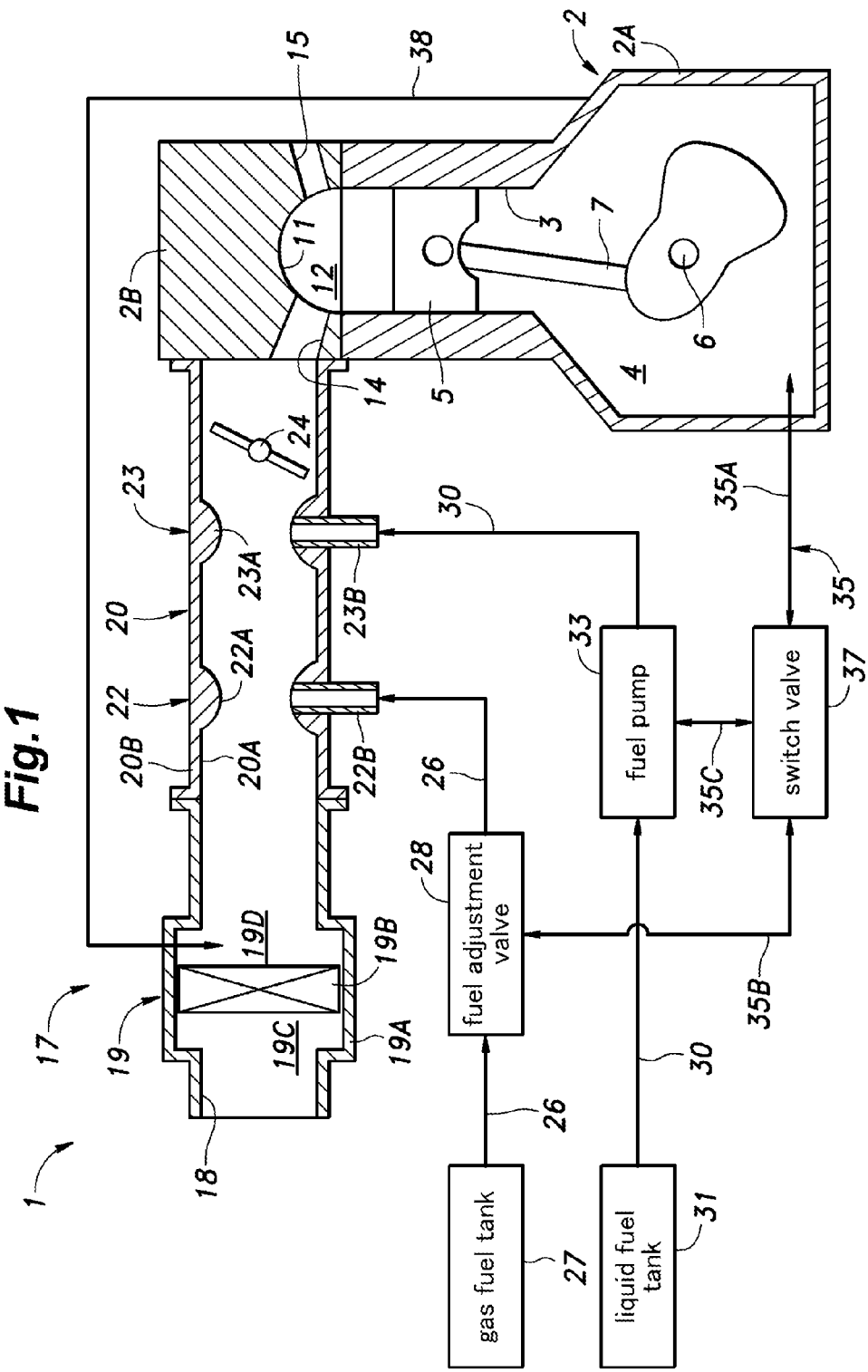
FIG. 1 is a schematic diagram of an internal combustion engine embodying the present invention.

The engine 1 of the illustrated embodiment consists, not exclusively, of a general-purpose engine that can be used for powering an electric generator or watercraft. As shown in FIG. 1, the engine 1 includes an engine main body 2 essentially consisting of a cylinder block 2A and a cylinder head 2B. The cylinder block 2A defines a cylinder 3 and a crankcase chamber 4 connected to the lower end of the cylinder 3. The cylinder 3 slidably receives a piston 5 therein, and the crankcase chamber 4 receives a rotatably supported crankshaft 6 therein. The piston 5 is connected to the crankshaft 6 by a connecting rod 7 in a per se known manner.

The part of the cylinder head 2B facing the cylinder 3 is formed with a combustion chamber recess 11 which defines a combustion chamber 12 in cooperation with the piston 5. The cylinder head 2B is also formed with an intake port 14 and an exhaust port 15 extending from the combustion chamber recess 11 in either lateral direction.

The intake port 14 communicates with an intake system 17 (intake passage) as will be discussed hereinafter, and the exhaust port 15 communicates with an exhaust system (exhaust passage) not shown in the drawings. The intake system 17 includes an intake inlet 18, an air cleaner 19 and a composite mixer 20 (a mixer incorporated with a carburetor), in that order from the upstream end thereof, and the downstream end of the intake system 17 communicates with the intake port 14.

The air cleaner 19 includes a case 19A and a filter 19B received in the case 19A. The inner space of the case 19A is separated by the filter 19B into an upstream chamber 19C and a downstream chamber 19D.

The composite mixer 20 integrally combines a mixer 22 for supplying the gas fuel, a carburetor 23 for supplying the liquid fuel and a throttle valve 24 for changing the opening area of the passage immediately upstream of the intake port 14. The composite mixer 20 is provided with a housing 20B defining a passage 20A therein. The mixer 22, the carburetor 23 and the throttle valve 24 are arranged in the passage 20A in that order from the upstream end thereof.

The mixer 22 includes a first venturi 22A defined by a wall surface protruding radially inward so as to narrow the passage 20A and a gas fuel supply outlet 22B provided in the first venturi 22A. The carburetor 23 includes a second venturi 23A defined by a wall surface protruding radially inward so as to narrow the passage 20A and a liquid fuel supply outlet 23B provided in the second venturi 23A. When the engine 1 is in operation, the suction caused by the downward stroke of the piston 5 during the intake stroke creates an intake flow in the passage 20A, and this intake flow in turn creates venturi negative pressure in the first venturi 22A and the second venturi 23A.

The gas fuel supply outlet 22B is connected to a gas fuel tank (gas cylinder) 27 serving as a gas fuel source via a gas fuel supply passage 26 which may consist of piping or the like. The gas fuel tank 27 stores LPG as a gas fuel which is liquefied under pressure. In other embodiments, the gas fuel supply passage 26 may be connected to a fuel gas pipeline such as utility gas line which serves as a gas fuel source via a suitable connecting device, instead of the gas fuel tank 27.

The gas fuel supply passage 26 is provided with a fuel adjustment valve (fuel gas on/off valve) 28 incorporated with a shut-off valve at an intermediate point thereof. The fuel adjustment valve 28 is configured to switch the communication state of the gas fuel supply passage 26, and adjust the pressure of the gas fuel passing through the fuel adjustment valve 28. Further details of the fuel adjustment valve 28 will be described hereinafter.

The liquid fuel supply outlet 23B is connected to a liquid fuel tank 31 serving as a liquid fuel source via a liquid fuel supply passage 30 which may consist of a conduit or the like. The liquid fuel tank 31 stores liquid fuel in liquid form. A fuel pump 33 is provided at an intermediate point of the liquid fuel supply passage 30.

The crankcase chamber 4 is connected to the fuel adjustment valve 28 and the fuel pump 33 via a pressure supply passage 35 which may consist of piping or the like. The pressure supply passage 35 includes a trunk passage 35A extending from the crankcase chamber 4, a first branch passage 35B and a second branch passage 35C branching from the trunk passage 35A at a branch point. The first branch passage 35B is connected to the fuel adjustment valve 28, and the second branch passage 35C is connected to the fuel pump 33.

The branch point is provided with a switch valve 37 consisting of a three-way valve which is connected to the trunk passage 35A, the first branch passage 35B and the second branch passage 35C so as to be switchable between a first state where the trunk passage 35A is connected to the first branch passage 35B and the second branch passage 35C is disconnected from the trunk passage 35A and the first branch passage 35B, and a second state where the trunk passage 35A is connected to the second branch passage 35C and the first branch passage 35B is disconnected from the trunk passage 35A and the second branch passage 35C. The switch valve 37 is provided with a knob on an outer end thereof to be manually operated by a user to select one of the first and second states.

The crankcase chamber 4 is connected to the downstream chamber 19D of the air cleaner 19 via a blowby gas passage 38 which may consist of piping or the like so that during the operation of the engine 1, the pressure in the crankcase chamber 4 changes in an oscillatory manner according to the combustion timing of the engine owing to the blow-by of the combustion gas from the combustion chamber 12 to the crankcase chamber 4 and the changes in the volume of the crankcase chamber 4 as the piston 5 reciprocates. Because the crankcase chamber 4 is connected to the intake system via the blowby gas passage 38, the crankcase chamber 4 is subjected to the intake negative pressure. Therefore, the pressure in the crankcase chamber 4 pulsates, and is negative when averaged over time. By operating the switch valve 37, the pulsating negative pressure of the crankcase chamber 4 may be supplied to a selected one of the fuel adjustment valve 28 and the fuel pump 33.

Figure 2:
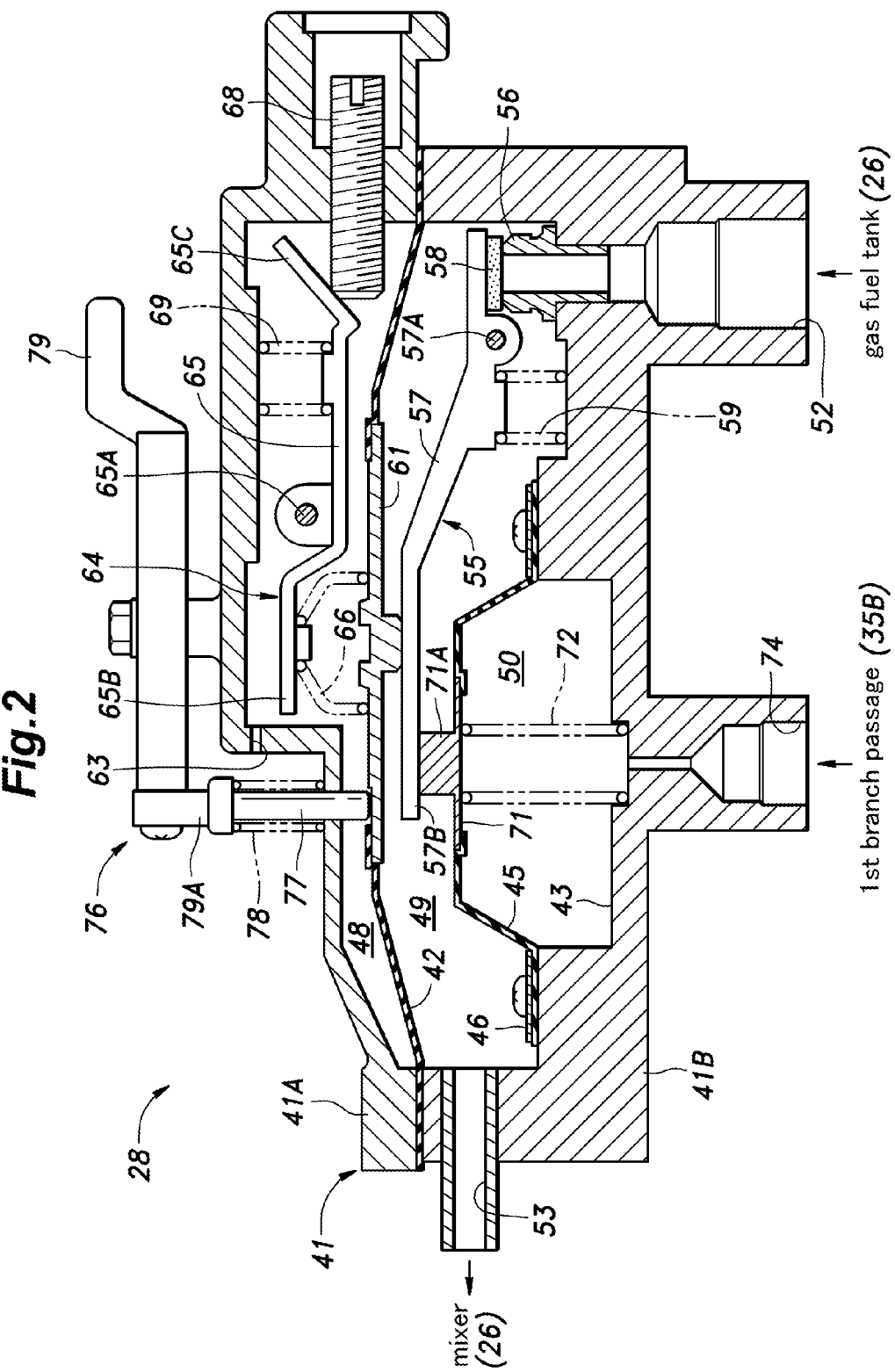
FIG. 2 is a vertical sectional view of a fuel adjustment valve.

As shown in FIG. 2, the case 41 of the fuel adjustment valve 28 includes a first case member 41A and a second case member 41B, and a first diaphragm 42 is interposed between the first case member 41A and the second case member 41B.

The second case member 41B is internally formed with a recess 43 which is enclosed by a second diaphragm 45. The peripheral edge of the second diaphragm 45 is interposed between an annular pressure plate 46 and the opposing surface of the second case member 41B. Thus, the interior of the case 41 is separated by the first diaphragm 42 and the second diaphragm 45 such that a pressure adjustment chamber 48 is defined between the first case member 41A and the first diaphragm 42, a fuel chamber 49 is defined between the first diaphragm 42, the second diaphragm 45 and the second case member 41B, and an actuation chamber 50 is defined between the second diaphragm 45 and the second case member 41B.

A gas fuel inlet 52 is formed on one end of the second case member 41B, and a gas fuel outlet 53 is formed on another end thereof, each communicating the fuel chamber 49 to the outside. In particular, the gas fuel inlet 52 is connected to a part of the gas fuel supply passage 26 communicating with the gas fuel tank 27, and the gas fuel outlet 53 is connected to a part of the gas fuel supply passage 26 communicating with the mixer 22 (or the gas fuel supply outlet 22B thereof). In other words, the gas fuel inlet 52 and the gas fuel outlet 53 connect the fuel chamber 49 in series with the gas fuel supply passage 26. Because the gas fuel outlet 53 is connected to the mixer 22 via the gas fuel supply passage 26, venturi negative pressure is applied to the fuel chamber 49 when the engine 1 is in operation.

The fuel chamber 49 is provided with a valve mechanism 55 for closing and opening the communication between the gas fuel inlet 52 and the gas fuel outlet 53. The valve mechanism 55 includes a valve seat 56 formed in the inner wall of the second case member 41B adjoining the inner end of the gas fuel inlet 52, a control lever 57 pivotally supported by the second case member 41B and a valve member 58 attached to one end of the control lever 57. The valve seat 56 is centrally provided with a hole that communicates with the gas fuel inlet 52. The control lever 57 is provided with a pivot shaft 57A in a lengthwise middle part thereof. The valve member 58 is moveable between a closed position where the valve member 58 is seated on the valve seat 56 and an open position where the valve member 58 is displaced away from the valve seat 56 as the control lever 57 pivots around the pivot shaft 57A. When the valve member 58 is in the closed position, the gas fuel inlet 52 is shut off from the fuel chamber 49, and when the valve member 58 is in the open position, the gas fuel inlet 52 communicates with the fuel chamber 49.

A first spring 59 consisting of a compression coil spring is interposed between the control lever 57 and the second case member 41B to urge the control lever 57 in the direction to move the valve member 58 towards the closed position. Owing to the biasing force of the first spring 59, the valve member 58 is in the closed position in the initial condition where the fuel chamber 49 is under the atmospheric pressure.

The first diaphragm 42 is centrally provided with a first retainer plate 61 which is connected to the other end 57B of the control lever 57 (opposite from the end attached to the valve member 58 with respect to the pivot shaft 57A). When the fuel chamber 49 is under the atmospheric pressure, the first diaphragm 42 is pushed into the pressure adjustment chamber 48 by the control lever 57 under the biasing force of the first spring 59. When the engine 1 is in operation, the venturi negative pressure is supplied to the fuel chamber 49 via the gas fuel supply passage 26 and the gas fuel outlet 53, and because the first diaphragm 42 is pulled into the fuel chamber 49 by this negative pressure, the control lever 57 forces the valve member 58 toward the open position against the biasing force of the first spring 59. As will be discussed hereinafter, the movement of the first diaphragm 42 is limited by the position of the second diaphragm 45.

The pressure adjustment chamber 48 communicates with the outside via a passage 63 formed in the first case member 41A. The pressure adjustment chamber 48 is internally provided with a pressure adjustment mechanism 64 for adjusting the pressure required to open the valve member 58. The pressure adjustment mechanism 64 includes a pressure adjustment lever 65 pivotally supported by the first case member 41A inside the pressure adjustment chamber 48 via a pivot shaft 65A provided in a lengthwise middle part thereof. A pressure adjustment spring 66 is interposed between an end 65B of the pressure adjustment lever 65 and a side of the first retainer plate 61 facing the pressure adjustment chamber 48.

An adjustment screw 68 is threaded into the wall of the first case member 41A from outside across the thickness thereof, and has a free end extending into the pressure adjustment chamber 48. The depth by which the free end of the adjustment screw 68 projects into the pressure adjustment chamber 48 can be changed by turning the adjustment screw 68 in the corresponding direction. The free end of the adjustment screw 68 engages a cam portion 65C formed on the other end of the pressure adjustment lever 65. A second spring 69 is interposed between the pressure adjustment lever 65 and the first case member 41A to urge the cam portion 65C into engagement with the free end of the adjustment screw 68. Thus, the cam portion 65C is kept in engagement with the free end of the adjustment screw 68 at all times by the second spring 69. When the adjustment screw 68 is caused to advance into the pressure adjustment chamber 48, the camming engagement between the cam portion 65C and the free end of the adjustment screw 68 causes the pressure adjustment lever 65 to rotate around the pivot shaft 65A thereof, causing a corresponding change in the preload which the pressure adjustment spring 66 applies to the first diaphragm 42. The preload which the pressure adjustment spring 66 applies to the first diaphragm 42 is smaller than the preload applied by the first spring 59 to the first diaphragm 42.

The first diaphragm 42 is thus urged toward the pressure adjustment chamber 48 by the difference between the preloads of the first spring 59 and the pressure adjustment spring 66. When the engine 1 is in operation, if the second diaphragm 45 is in the retreated position (toward the pressure adjustment chamber 48) as will be discussed hereinafter, and the venturi negative pressure acting upon the first diaphragm 42 via the gas fuel supply passage 26 is greater than the difference between the preloads of the first spring 59 and the pressure adjustment spring 66, the first diaphragm 42 is displaced such that the valve member 58 is forced to the open position thereof. The difference between the preloads of the first spring 59 and the pressure adjustment spring 66 can be adjusted by turning the adjustment screw 68.

The second diaphragm 45 is centrally provided with a second retainer plate 71, and the side of the second retainer plate 71 facing the fuel chamber 49 is provided with a limiting portion 71A protruding toward the fuel chamber 49. A third spring 72 consisting of a compression coil spring is interposed between the side of the second retainer plate 71 facing the actuation chamber 50 and the bottom of the recess 43 of the second case member 41B. The second diaphragm 45 is thus urged by the third spring 72 toward the fuel chamber 49 so that the second diaphragm 45 protrudes toward the fuel chamber 49 in the initial condition where the actuation chamber 50 is under the atmospheric pressure.

The recess 43 of the second case member 41B is formed with a pressure inlet port 74 communicating the actuation chamber 50 with the outside. The pressure inlet port 74 is connected to the first branch passage 35B of the pressure supply passage 35. When the negative pressure of the crankcase chamber 4 is supplied to the actuation chamber 50 via the first branch passage 35B, the actuation chamber 50 is placed under a negative pressure condition so that the second diaphragm 45 is pulled toward the actuation chamber 50 against the biasing force of the third spring 72. As a result, the limiting portion 71A recedes away from the fuel chamber 49.

In the initial condition where the actuation chamber 50 is not supplied with negative pressure, and is hence under the atmospheric pressure, the limiting portion 71A engages the opposing end of the control lever 57 to limit the movement of the control lever 57 so that the valve member 58 is maintained in the closed position. In this case, even when the venturi negative pressure is supplied to the fuel chamber 49, the valve member 58 is maintained in the closed position. On the other hand, when the negative pressure of the crankcase chamber 4 is supplied to the actuation chamber 50 via the pressure supply passage 35, the limiting portion 71A recedes away from the fuel chamber 49 so that the control lever 57 is allowed to move. As a result, when the venturi negative pressure is supplied to the fuel chamber 49, the valve member 58 is allowed to move to the open position.

The first case member 41A is provided with a forced valve opening mechanism 76 for unilaterally opening the valve mechanism 55. The forced valve opening mechanism 76 includes a pushrod 77 passed through the wall of the first case member 41A in an axially moveable manner, a fourth spring 78 consisting of a compression coil spring interposed between the pushrod 77 and the first case member 41A for urging the pushrod 77 out of the first case member 41A, and an operation lever 79 pivotally supported on the exterior of the first case member 41A. One end of the operation lever 79 is provided with a pressure member 79A for pushing the pushrod 77 into the pressure adjustment chamber 48 by engaging the outer end of the pushrod 77 in dependence on the rotational position of the operation lever 79. The inner end of the pushrod 77 is located so as to be engaged by the side of the first retainer plate 61 facing the pressure adjustment chamber 48 so that the pressure member 79A pushes the first retainer plate 61 into the fuel chamber 49 when the operation lever 79 is turned to a corresponding position. As a result, the control lever 57 is displaced against the biasing force of the first spring 59 and the third spring 72 so as to move the valve member 58 to the open position. In this manner, by appropriately operating the operation lever 79, the valve mechanism 55 can be opened even when no negative pressure is supplied to the actuation chamber 50.

Figure 3:
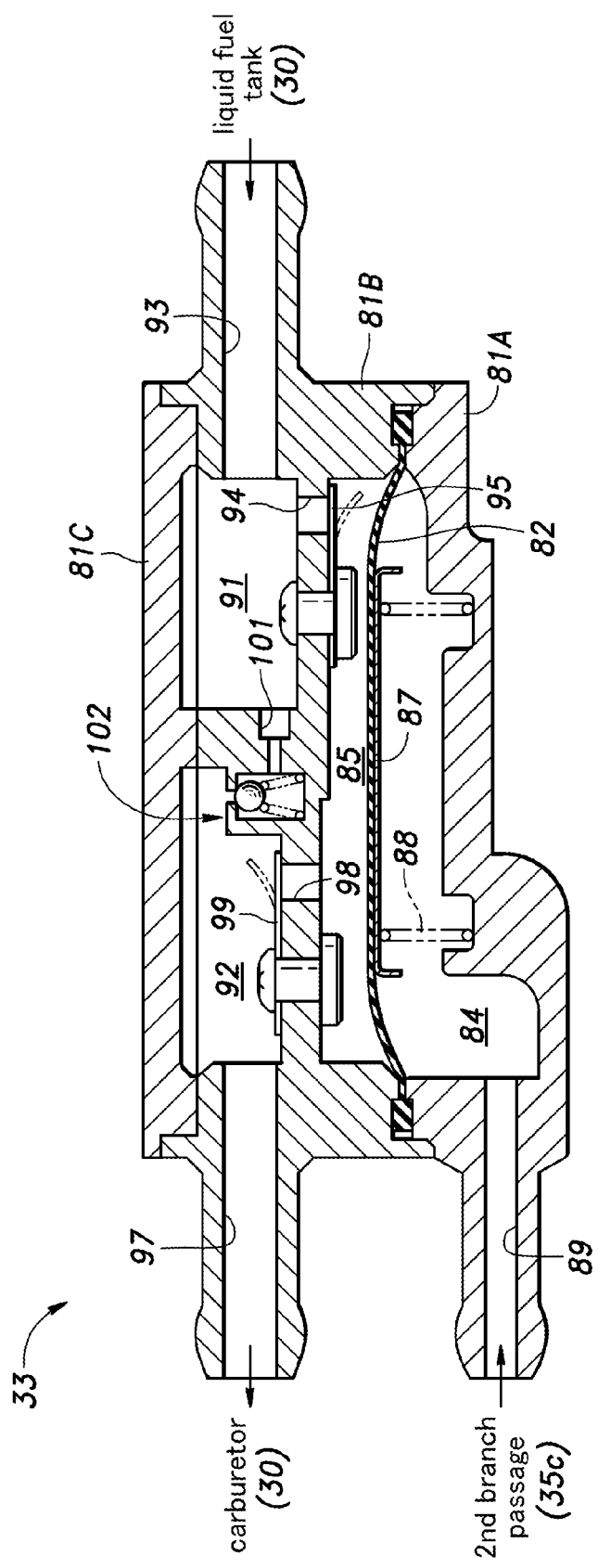
FIG. 3 is a vertical sectional view of a fuel pump.

Referring to FIG. 3, the fuel pump 33 consists of a diaphragm type fuel pump. The outer shell of the fuel pump 33 is formed by a first pump case member 81A, a second pump case member 81B and a third pump case member 81C which are layered and joined one over and to another. A third diaphragm 82 is interposed between the first pump case member 81A and the second pump case member 81B. The third diaphragm 82 separates the space defined between the first pump case member 81A and the second pump case member 81B into a pump actuation chamber 84 on the side of the first pump case member 81A, and a pump chamber 85 on the side of the second pump case member 81B.

The third diaphragm 82 is centrally provided with a third retainer plate 87 on the side thereof facing the pump actuation chamber 84. A fifth spring 88 consisting of a compression coil spring is interposed between the third retainer plate 87 and the first pump case member 81A so that the third diaphragm 82 is biased toward the pump chamber 85. The first pump case member 81A is formed with a pressure inlet port 89 communicating the pump actuation chamber 84 with the outside. The pressure inlet port 89 is connected to the second branch passage 35C of the pressure supply passage 35.

An inlet chamber 91 and an outlet chamber 92 are defined between the second pump case member 81B and the third pump case member 81C as two independent chambers. The second pump case member 81B is formed with a fuel inlet 93 communicating the inlet chamber 91 with the outside. The fuel inlet 93 is connected to a part of the liquid fuel supply passage 30 communicating with the liquid fuel tank 31. The second pump case member 81B is formed with an inlet hole 94 for communicating the inlet chamber 91 with the pump chamber 85. The open end of the inlet hole 94 on the side of the pump chamber 85 is provided with an inlet valve 95 which is constructed as a reed valve. The inlet valve 95 consists of a one-way valve that permits only the flow directed from the outlet chamber 92 to the pump chamber 85. The inlet valve 95 is attached to the second pump case member 81B by using rivets or the like.

The second pump case member 81B is formed with a fuel outlet 97 communicating the outlet chamber 92 with the outside. The fuel outlet 97 is connected to a part of the liquid fuel supply passage 30 communicating with the carburetor 23. The second pump case member 81B is formed with an outlet hole 98 communicating the outlet chamber 92 with the pump chamber 85. The open end of the outlet hole 98 on the side of the outlet chamber 92 is provided with an outlet valve 99 which is constructed as a reed valve. The outlet valve 99 consists of a one-way valve that permits only the flow directed from the pump chamber 85 to the outlet chamber 92. The outlet valve 99 is attached to the second pump case member 81B by using rivets or the like.

A relief passage 101 is formed in the second pump case member 81B to communicate the inlet chamber 91 with the outlet chamber 92, and is provided with a relief valve 102. The relief valve 102 consists of a one-way valve that permits only the flow directed from the outlet chamber 92 to the inlet chamber 91, and is configured to open only when the pressure difference between the inlet chamber 91 and the outlet chamber 92 is greater than a prescribed value so that an excessive pressure rise in the outlet chamber 92 may be avoided.

The fuel pump 33 is powered by the pulsating pressure of the crankcase chamber 4 supplied to the pump actuation chamber 84 thereof via the pressure supply passage 35, and feeds the liquid fuel from the side of the liquid fuel tank 31 to the side of the carburetor 23. As the pulsating pressure of the crankcase chamber 4 is supplied to the pump actuation chamber 84, the third diaphragm 82 oscillates between the pump actuation chamber 84 and the pump chamber 85 so that the pressure in the pump chamber 85 cyclically rises and drops. When the pressure in the pump chamber 85 is reduced, the outlet valve 99 closes, and the inlet valve 95 opens so that the liquid fuel is drawn from the inlet chamber 91 to the pump chamber 85. Conversely, when the pressure in the pump chamber 85 is increased, the outlet valve 99 opens, and the inlet valve 95 closes so that the liquid fuel is pushed out from the pump chamber 85 to the outlet chamber 92. By repeating this operation, the fuel pump 33 feeds the liquid fuel to the side of the carburetor 23.

The mode of operation of the engine 1 of the illustrated embodiment is described in the following. This engine 1 allows the fuel thereof to be selected from liquid fuel and gas fuel by operating the switch valve 37. The switch valve 37 can be switched between the first state for connecting the trunk passage 35A with the first branch passage 35B and disconnecting the second branch passage 35C from the trunk passage 35A and the first branch passage 35B, and the second state for connecting the trunk passage 35A with the second branch passage 35C and disconnecting the first branch passage 35B from the trunk passage 35A and the second branch passage 35C. When the first state is selected by the switch valve 37, the fuel adjustment valve 28 can be opened so that the gas fuel can be supplied to the mixer 22, and without the fuel pump 33 being actuated, the supply of liquid fuel to the carburetor 23 is shut off. When the second state is selected by the switch valve 37, the fuel adjustment valve 28 is kept closed so that the supply of gas fuel to the mixer 22 is shut off, and with the fuel pump 33 being actuated, the liquid fuel is supplied to the carburetor 23.

In the engine 1 of the illustrated embodiment, because the supply of the gas fuel and the liquid fuel is shut off by using the fuel adjustment valve 28 and the fuel pump 33, respectively, no additional shut off valve is required to be provided in the gas fuel supply passage 26 and/or the liquid fuel supply passage 30. Because the switch valve 37 consists of a three-way valve, the supply of the fuel to be used and the shutting off of the fuel that is not to be used can be selected with a single operation so that the switching operation of the two kinds of fuel can be accomplished easily, and an inadvertent failure to shut off the fuel that is not to be used can be effectively avoided.

Because the switch valve 37 is provided in the pressure supply passage 35, instead of the gas fuel supply passage 26 or the liquid fuel supply passage 30, no special sealing arrangement for preventing the leakage of the gas fuel or liquid fuel is required. Also, because the pressure supply passage 35 is under a negative pressure on average, the risk of gas containing fuel such as blowby gas leaking out from the switch valve 37 can be minimized.

The present invention has been described in terms of a specific embodiment, but the present invention is not limited by the illustrated embodiment, but may be modified freely without departing from the spirit of the present invention. For instance, the structures of the fuel adjustment valve 28 and the fuel pump 33 of the illustrated embodiment are only exemplary, and can be substituted by any per se known structures. In the illustrated embodiment, the trunk passage 35A of the pressure supply passage 35 directly communicated with the crankcase chamber 4, but it may also be arranged such that the trunk passage 35A is indirectly communicated with the crankcase chamber 4 by being connected to the blowby gas passage 38.

The trunk passage 35A of the pressure supply passage 35 communicated with the crankcase chamber 4 in the foregoing embodiment, but it suffices if the trunk passage 35A communicates with a pressure source in the engine 1. The pressure source may be found in the interior of the intake system 17, for instance, and in particular a part of the interior of the intake system 17 downstream of the throttle valve 24 because the downstream part of the throttle valve 24 is exposed to the intake negative pressure created by the reciprocating movement of the piston 5 in an intermittent manner in response to the opening and closing movement of the engine intake valve (not shown in the drawings). Therefore, the trunk passage 35A of the pressure supply passage 35 may also be connected to a downstream part of the throttle valve 24 in the intake system 17.

The composite mixer 20 used in the illustrated embodiment is also only exemplary, and may be arranged in various different ways. For instance, the gas fuel supply outlet 22B may be provided in the second venturi 23A. In such a case, the open end of the gas fuel supply outlet 22B may be placed opposite to the open end of the liquid fuel supply outlet 23B. An insulator may be interposed between the flanges for connecting the composite mixer 20 with the air cleaner 19 so that the gas fuel supply outlet 22B may be provided in this insulator.

Although the present invention has been described in terms of a preferred embodiment thereof, it is obvious to a person skilled in the art that various alterations and modifications are possible without departing from the scope of the present invention which is set forth in the appended claims. The contents of the original Japanese patent application on which the Paris Convention priority claim is made for the present application as well as the contents of the prior art references mentioned in this application are incorporated in this application by reference.

The invention claimed is:

1. A bi-fuel engine that can selectively use one of gas fuel and liquid fuel, comprising:
    a gas fuel supply passage connecting a gas fuel source with an intake system;
    a liquid fuel supply passage connecting a liquid fuel source with the intake system;
    a pressure supply passage extending from a pressure source of the engine, and branching into a first branch passage and a second branch passage at a branching portion;
    a gas fuel on/off valve provided in the gas fuel supply passage and connected to the first branch passage so that the gas fuel supply passage may be opened when pressure is supplied to the gas fuel supply passage, and may be closed when pressure is not supplied to the gas fuel supply passage;
    a liquid fuel pump provided in the liquid fuel supply passage and configured to feed the liquid fuel under pressure to the intake system by a pulsating pressure supplied via the second branch passage; and
    a switch valve provided in the branching portion to switch between the first branch passage and the second branch passage for conducting pressure supplied from the pressure source via the pressure supply passage.

2. The bi-fuel engine according to claim 1, wherein the pressure source of the engine comprises a crankcase chamber of the engine.

3. The bi-fuel engine according to claim 2, wherein the crankcase chamber communicates with an intake passage via a blowby gas passage so that pressure in the crankcase chamber is negative on average, and the gas fuel on/off valve is configured to open and close the gas fuel supply passage when supplied by negative pressure via the pressure supply passage.

4. The bi-fuel engine according to claim 3, wherein the gas fuel on/off valve is provided with a pressure adjustment mechanism.

5. The bi-fuel engine according to claim 4, wherein the gas fuel on/off valve comprises:
    a case internally defining a first chamber and a second chamber separated by a diaphragm;

a fuel inlet and a fuel outlet formed in the case for connecting the first chamber in series with the gas fuel supply passage;
a valve seat provided between the fuel inlet and the fuel outlet in the first chamber;
a valve member configured to cooperate with the valve seat; and
a pressure inlet port communicating the second chamber with the first branch passage;
wherein the diaphragm is positioned at a closed position for forcing the valve member to seat on the valve seat when no negative pressure is supplied to the second chamber, and at an open position for permitting the valve member to be displaced from the valve seat when negative pressure is supplied to the second chamber.

6. The bi-fuel engine according to claim 1, wherein the switch valve consists of a manually operated three-way valve.

* * * * *